United States Patent [19]

Ullrich

[11] 4,040,607
[45] Aug. 9, 1977

[54] METHOD OF BUILDING UP PRESSURE BY MULTI-SHAFT SCREW EXTRUDERS

[75] Inventor: Martin Ullrich, Leverkusen, Germany

[73] Assignee: Bayer Aktiengesellschaft, Leverkusen, Germany

[21] Appl. No.: 615,268

[22] Filed: Sept. 22, 1975

[30] Foreign Application Priority Data

Sept. 28, 1974 Germany .............................. 2446436

[51] Int. Cl.² .............................................. B29B 1/10
[52] U.S. Cl. ..................................... 259/192; 425/204
[58] Field of Search .............. 259/192, 9, 10, DIG. 8; 425/204

[56] References Cited

U.S. PATENT DOCUMENTS

| | | | |
|---|---|---|---|
| 3,146,493 | 9/1964 | Steinle et al. | 259/DIG. 8 |
| 3,423,074 | 1/1969 | Loomans | 425/204 |
| 3,525,124 | 8/1970 | Ocker | 425/204 |
| 3,749,375 | 7/1973 | Hermann et al. | 259/192 |

*Primary Examiner*—Richard E. Aegerter
*Assistant Examiner*—L. Footland
*Attorney, Agent, or Firm*—Gene Harsh; Joseph C. Gil

[57] ABSTRACT

This invention relates to multi-shaft screw extruders in which the screw shafts are arranged to intermesh in pairs and rotate pairwise in the same sense, each shaft of a pair having at least one double threaded or triple threaded pressure build-up section corresponding to that of the other shaft. This invention also relates to a method of using such an extruder to build up pressure within a material with a minimum pressure build-up section and a minimum power input. The extruder and its method of operation are characterized by the fact that at least a portion of the pressure build-up section satisfies

$$0.7 \cdot f\left(\frac{h}{d}, \frac{q}{n \cdot d^3}\right) < \frac{t}{d} < 1.8 \, f\left(\frac{h}{d}, \frac{q}{n \cdot d^3}\right)$$

wherein $t$ is the screw pitch, $d$ is the internal diameter of the housing, $q$ is the volumetric throughput of material of a screw pair and $n$ is the speed of rotation of the screw shafts and:

$$f\left(\frac{h}{d}, \frac{q}{n \cdot d^3}\right) = \frac{A}{h/d} \cdot \left[ a \cdot \left(\frac{q}{n \cdot d^3}\right) - b \cdot \left(\frac{q}{n \cdot d^3}\right)^2 + c \cdot \left(\frac{q}{n \cdot d^3}\right)^3 \right]$$

wherein in triple thread pressure build-up sections
$A = 0.1082$;
$a = 15.316$;
$b = 69.111$;
and
$c = 261.85$
and in double thread pressure build-up sections
$A = 0.206$;
$a = 8.8212$;
$b = 18.414$;
and
$c = 31.668$.

2 Claims, 7 Drawing Figures

METHOD OF BUILDING UP PRESSURE BY MULTI-SHAFT SCREW EXTRUDERS

FIELD OF THE INVENTION

This invention relates to a method of building up pressure within a material using a multi-shaft screw extruder in which the screw shafts are arranged to intermesh in pairs and to rotate pairwise in the same sense, each shaft of a pair having at least one double threaded or triple threaded pressure build-up section corresponding to that of the other shaft.

The term "extruder" comprises not only extrusion screw machines but all suitable kinds of screw machines, i.e. such as screw machines for reacting, evaporating, mixing, compounding, melting, crystallizing, kneading, expelling and expanding.

BACKGROUND OF THE INVENTION

Multi-shaft screw extruders of this kind, e.g. those described in literature references (1,2), German Pat. No. 862,668 and German Pat. No. 1,111,154, frequently have sections which act as flow resistances against the axial flow through the machine. Such resistances have been described, for example in (3) and U.S. Pat. No. 3,122,356. They may be equipped, for example, with kneading discs (4), various forms of which have been discloses e.g. in German Pat. No. 813,154 and German Pat. No. 940,109. Kneading block (4) composed of several kneading discs set at various angles have been described in German Pat. No. 813,154 and so called braking screws (5) in German Pat. No. 949,162. These are sections of the screw in which the material is urged to flow in the direction opposite to the spontaneous direction of transport of these sections of screw (6,7). Other flow resistances consist of screw sections in which the throughput of material is in the same direction as the spontaneous transport of this section of the screw but greater than the normal, unrestricted flow (6,7).

Such sections within an extruder, or such elements arranged in it, fulfill widely differing functions, for example, melting, mixing, dispersing, plasticizing, breaking up of dye agglomerates in highly viscous melts, wetting, distribution (3), local supply of large quantities of energy by producing shearing and frictional forces in the material, kneading or damming up for example so as to ensure that the entire cross-section of the screw extruder is completely filled up for the purpose of blocking off various pressure stages, e.g. in evaporator screws. The shaping tool usually provided at the end of an extruder also acts as a flow resistance. All these various flow resistances, which have been mentioned here merely as examples, cause a drop in pressure in the direction of flow through the extruder, and this pressure drop must first be built up by pressure build-up sections situated upstream of the resistances.

It is an object of this invention to optimize, i.e. to find the best possible design from a geometrical and energy exchange point of view, for such pressure build-up zones which must be provided in front of every flow obstruction in multi-shaft screw extruders in which the shafts intermesh and rotate in pairs in the same sense.

Theoretical investigations are known which deal with similar problems in single screw extruders. G. Schenkel (8,9), for example, deals with energy optimized melt extruders, i.e. single screw extruders charged with melt and used for discharging and shaping the melt. For these extruders, G. Schenkel describes in particular the correct choice of the speed of revolution and of the depth of thread.

O. Armstroff and H. D. Zettler (3) deal with the present state of the art of optimizing multi-shaft screw extruders which have intermeshing screw shafts rotating in the same sense. To quote: "Such advantageous arrangements of screws can at present be achieved only by trial and error and that actual experience described here provide a valuable but not sufficient basis and guide line for the design of screws. An optimum design is generally obtained only after repeated re-construction which invaviably entail production stoppages so that added to the cost of re-construction are the cost due to production losses." It is also indicated in (3) how the known methods of calculation employed for single screw extruders (10) can be applied in a simplified form to the much more complicated configuration of flow found in intermeshing double screw extruders with both screws rotating in the same sense. This method of calculation is restricted to determining the "length of backlog," that is to say the length of product filled section of the screw in which pressure is built up in front of the above-mentioned flow resistances. When the calculated pressure build up lengths are compared with the experimentally determined lengths also reported (3), the correlations are not satisfactory. It is also said in (3) that "the possibility of transferring this method to other production machines still remains to be tested."

German Offenlegungsschrift No. 2,236,902 deals with the problem of designing the pressure build-up zones in front of flow resistances in double screw extruders with intermeshing screws rotating in the same sense with a view to "ensuring low energy dissipation." As means for achieving this, the said German Offenlegungsschrift describes singly thread or double thread "close meshing" trapezoidal screw profiles with a ratio of screw pitch to external diameter of screw of 0.2 to 1.5 for the pressure build-up sections, in contrast to the screw profiles conventionally used in these extruders, which are frequently triple thread, close meshing and scraping, e.g. as described in German Pat. No. 862,668. Apart from the fact that trapezoidal profiles in double screw extruders in which the screws rotate in the same sense are kinematically unable to mesh closely and would, therefore, appear to be less suitable as means of building up a pressure on account of the greater amount of backflow due to leakage, the trapezoidal profiles claimed in the said document are constructed with very wide screw ridges so that the product located there would be subjected to high shearing stress. It therefore appears questionable whether the desired object of exceptionally low energy dissipation could be achieved with the means claimed.

SUMMARY OF THE INVENTION

According to the invention, there is provided a multi-shaft screw extruder and a method of building up pressure within a material using this multi-shaft screw extruder which has a plurality of screw shafts arranged to intermesh in pairs and to rotate pairwise in the same sense, in which each screw shaft of a pair has at least one double thread or triple thread pressure build-up section corresponding to that of the other screw shaft, wherein the pressure build-up sections have at least in part a ratio of screw pitch $t$ to internal diameter of housing $d$ within the range given by the following relationships:

$$\frac{t}{d} > 0.7 \cdot f\left(\frac{h}{d}, \frac{q}{n \cdot d^3}\right);$$

$$\frac{t}{d} < 1.8 \cdot f\left(\frac{h}{d}, \frac{q}{n \cdot d^3}\right)$$

where $q$ is the volumetric throughput of material of a screw pair and $n$ is the speed of rotation of the screw shafts and:

$$f\left(\frac{h}{d}, \frac{q}{n \cdot d^3}\right) = \frac{A}{h/d} \cdot \left[a \cdot \left(\frac{q}{n \cdot d^3}\right) - b \cdot \left(\frac{q}{n \cdot d^3}\right)^2 + c \cdot \left(\frac{q}{n \cdot d^3}\right)^3\right]$$

wherein in triple thread pressure build-up sections
$A = 0.1082$
$a = 15.316$;
$b = 69.111$;
and
$c = 261.85$
and in double thread pressure build-up sections
$A = 0.206$
$a = 8.8212$;
$b = 18.414$;
and
$c = 31.668$.

BRIEF DESCRIPTION OF THE DRAWINGS

In the Figures the symbols used have the following meaning:

FIG. 1 o = Minimum pressure build up length L
• = Minimum driving power P

FIG. 2

+ x = Operating points for the large screw extruder of Example 3
+ 1,2 = Operating states requiring optimization
x 3,4 = Substantially improved operating states
o • = Operating points for the screw extruder of Examples 4 and 5
o A, C, E = Operating states requiring optimization
•B, D = Optimized operating states

FIG. 3 o • = Operating points for the screw extruder from Example 6
o II, III = Operating states requiring optimization
•I = Optimized operating state

DETAILED DESCRIPTION OF THE INVENTION

For optimizing the above-mentioned pressure build-up zones, two major questions arise:
1. How can these zones be made as short possible?

This question practically always arises because the high quality multi-shaft screw extruders described above are always used to perform numerous operational steps along their length.(3). It is then necessary either to make room for new process steps in a given machine by reducing the length of the individual process zones, in other words also the length of the pressure build-up zones, so that even better use can be made of the given total length, or to leave the length of the pressure build-up zones unchanged but improve their capacity for building up pressure so that the rate of product output in the machine as a whole can be increased. Whereas the two last mentioned motives are connected with operationally optimizing screw extruders already available, it is of course desirable when designing new screw extruders for a specified task to minimize the total expenditure on the machine and, therefore, also the length of the pressure build-up zones.

2. How can the above-mentioned pressure build-up zones be made as efficient as possible from the point of view of energy comsumption It should be mentioned here that screw extruders, which are usually employed for extremely viscous substances, by the very nature of their task require high mechanical driving power and this mechanical energy is to a large extent dissipated in the viscous material by internal friction, shearing and kneading forces. When this happens, the material also heats up in the pressure build-up zones and only a small proportion of the mechanical energy can be utilized for the pumping action itself (= volumetric rate of throughout x pressure build up). This heating up by internal friction is advantageously utilized in certain processing steps of the screw as an effective method of producing a localized intense supply of energy. If, however, the product has already been heated to the limit of its thermal stability in the process steps it has already passed through in the screw and if it must pass through a pressure build-up zone while in this state, for example at the end of the extruder before reaching a shaping tool, it is very important to build-up the necessary pressure with as little energy dissipation as possible, that is to say with maximum build up of pressure and minimum driving power, particularly since the possibilities of cooling are very limited in such highly viscous materials. The minimization of energy consumption in the pressure build-up zones is thus motivated partly by the specified properties of the material (the extent to which it can stand heat) and partly, of course, by the desire to reduce the mechanical driving power required.

The screw extruders under discussion here, which have intermeshing screw shafts rotating pairwise in the same sense, normally have relative radial screw clearances between the crest of the screw and the wall of the housing between 0.001 to 0.015, depending on the material of which the extruders made, and relative clearances between the two screw shafts of a pair, in other words between the crest of the thread on one shaft and the base of the thread on the other, of between 0.002 and 0.025, based in each case on the internal diameter of the screw housing. Furthermore, multi-shaft screw extruders of this kind have a given axial distance between the screw shafts, which is determined by the transmission. Since the screws are generally arranged with their axes parallel to each other and it is normally desired to retain the closely meshing effect, in other words the selfcleaning effect, over the entire length of the screw, the depth of thread cannot easily be varied along a screw shaft because the external diameter and root diameter of the screw shaft would then have to be varied at the same time, which in practice would require reconstruction of the housing. The depth of thread therefore cannot be used as a variable for optimizing any zone of the machine. By contrast, in single shaft screw extruders it is the depth of thread which is the decisive optimizing parameter (8,9). Although the ratio of depth of thread to internal diameter of the housing varies within the series of models of multi-shaft screw extruders, e.g. in extruders with triple thread screw shafts it varies substantially between 0.06 and 0.13, the ratio is normally constant within a given machine. The screw pitch on the other hand, can be varied more easily in the multi-shaft extruders described here, and even commercially available standard models are equipped with sets of interchangeable screw elements (3,4). Screw sets are normally supplied in the form of an assembly kit of replaceable elements which normally have a ratio of screw pitch to internal diameter of the housing of between 0.4 and 1.7. The screw pitch is therefore the essential parameter for optimizing such a machine.

The inventive knowledge that a preferential ratio of screw pitch $t$ to internal housing diameter $d$ could be used as optimization criterion for the pressure build-up sections in multi-shaft screw extruders was found to be confirmed by experiments carried out on a triple thread two shaft extruder. This machine had a ratio of depth of thread to internal housing diameter of 0.1082. This is illustrated in FIG. 1 of the drawing where the experimentally determined optimum ratio $t/d$ is plotted against the non-dimensional throughout coefficient $q/nd^3$ where $q$ is the volumetric throughout of the product for a pair of screw shafts, $n$ is the speed of rotation of the screw shafts and $d$ is the internal housing diameter of a bore.

For a given pumping task, i.e. a given build up of pressure at a given point in the extruder, characterized by given values for the pressure build up $\Delta p$, the dynamic viscosity $\eta$, the volumetric throughput $q$, the speed of screw rotation $n$ and the internal diameter of screw housing $d$, the length of pressure build-up zone L required to perform this taks varies according to the screw pitch and passes through a minimum, or in other words an optimum since it is desired to obtain short pressure build-up pressure build-up zones. There is thus a particular ratio $t/d$ which the pressure build-uo length is at a minimum. The optimum pitch ratio $t/d$ for obtaining a minimum length of pressure build-up zone is, however, not generally applicable but depends on the throughout coefficient $g.nd^3$ which characterizes the state of flow. In FIG. 1, this experimentally determined relationship is represented by the symbol o. The optimum pitch ratio of $t/d$ is independent of the height of pressure required to be built up and independent of the viscosity of the product.

On further investigation of optimization criterion defined above, it is also found that for a given pumping task defined by $\Delta p$, $q$, $\eta$, $n$ and $d$, there is a particular pitch ratio $t/d$ at which the driving power p required in this pressure build-up section is at a minimum. This was confirmed be experiments with varying pitches. This particular pitch ratio $t/d$ which is optimum in the sense of producing minimum energy requirement, is again independent of the pressure required to be built up and of the viscosity. It depends solely but decisively on the throughput coefficient $q/nd^3$. This relationship confirmed by experiments is entered in FIG. 1 with the symbols •.

Figure 1:
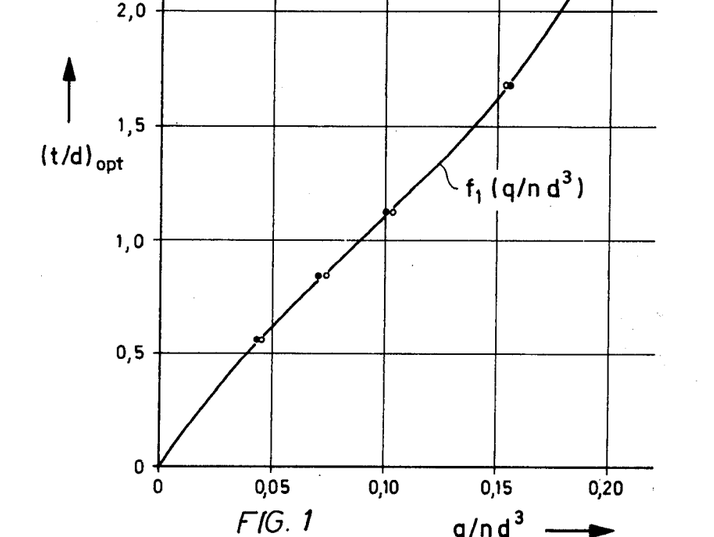
FIG. 1 is a plot of the screw pitch to internal housing diameter ratio $(t/d)$ versus the non-dimensional throughout coefficient $(q/nd^3)$ for optimum operating conditions of triple thread pressure build-up sections.

Now it is particularly surprising that, as can be seen from FIG. 1, the minimization of the energy requirement P and the minimization of geometric dimension L both lead to practically the same optimum pitch ratio $t/d$ and this high correlation is maintained over the whole range of values for $q/nd^3$ which is significant for practical purposes. The following mathematical equation can, therefore, be given as the essential, single solution which is valid both for the geometric and the energy aspects:

$$(t/d)_{opt} = 15.316 \cdot \left(\frac{q}{n \cdot d^3}\right) - 69.111 \cdot \left(\frac{q}{n \cdot d^3}\right)^2 + 261.85 \cdot \left(\frac{q}{n \cdot d^3}\right)^3 = f_1\left(\frac{q}{n \cdot d^3}\right)$$

The graph of this equation is shown as a continuous curve in FIG. 1.

In practice, when optimizing the pitch, one is restricted to certain standard measurements so that it is not possible to realize every numerical value for $t$ obtained from the above formula or from FIG. 1. An optimization area is therefore given below. It is represented by the shaded area in FIG. 2 on either side of the graph representing the above equation and is bounded by the two following limiting curves.

Figure 2:
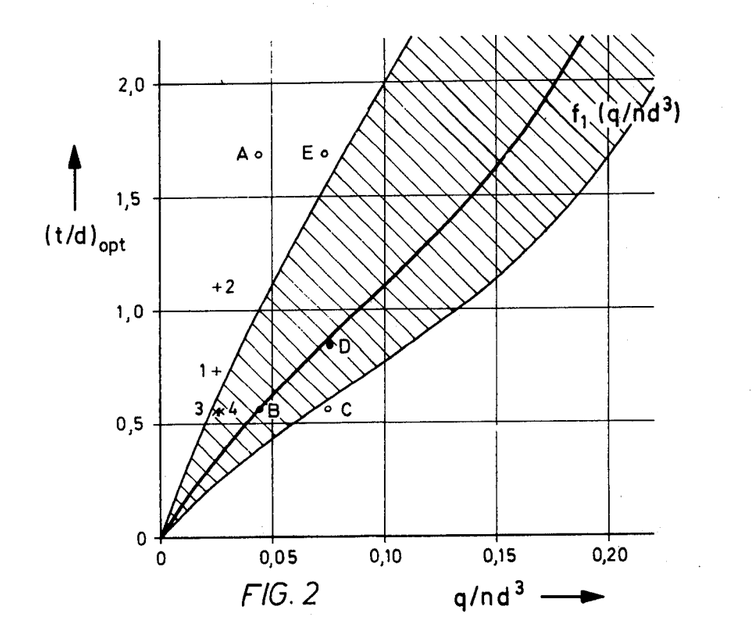
FIG. 2 is a plot of the optimization area of $(t/d)$ versus $(q/nd^3)$ for triple thread pressure build-up section and also a plot of the experimental conditions of Examples 3 to 5.

Lower limit curve: $\frac{t}{d} = 0.7 \cdot f_1\left(\frac{q}{n \cdot d^3}\right)$ Upper limit curve: $\frac{t}{d} = 1.8 \cdot f_1\left(\frac{q}{n \cdot d^3}\right)$ Another reason why the shaded optimization area is given in FIG. 2 is that, as already mentioned above, in this type of multi-shaft screw extruder with triple thread screws, the ratio of depth of thread to the internal diameter of the housing varies from about 0.06 to 0.13. The solution according to the invention was found by experiments on a screw extruder of the type mentioned above with a ratio of depth of thread to diameter of $h/d = 0.1082$ (see Examples 1 and 2) so that the graph in FIG. 1 and the above mathematical function for $f_1$ apply to this ratio of $h/d$.

The optimization area in FIG. 2 applies partially to other ratios of depth of thread to diameter within the range given above, i.e. about 0.06 to about 0.13 the smaller values for $t/d$ in this area being preferable for larger relative depths of thread $h/d$ and the larger values for $t/d$ being preferably for smaller relative depths of thread. This is considered and made precise in the mathematical equation by using $f$ instead of $f_1$ wherein $$f\left(\frac{h}{d}, \frac{q}{n \cdot d^3}\right) = \frac{0.1082}{h/d} \cdot f_1\left(\frac{q}{n \cdot d^3}\right)$$

Of course in view of the above mentioned reasons for all $h/d$ ratios there are also necessary optimization areas, which are defined by the following limiting curves:

lower limit curve: $\frac{t}{d} = 0.7 \cdot f\left(\frac{h}{d}, \frac{q}{n \cdot d^3}\right)$ upper limit curve: $\frac{t}{d} = 1.8 \cdot f\left(\frac{h}{d}, \frac{q}{n \cdot d^3}\right)$ In practice of course the whole pressure build up zone should hve the optimum pitch as it is shown in the Examples. Therewith is achieved the highest advantage. Nevertheless it is evident that it is already of advantage compared with the prior art if only a smaller part of the pressure build up zone is suppled with the optimum pitch.

Figure 4:
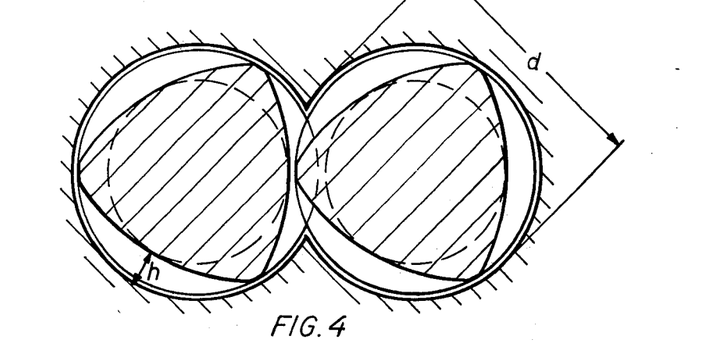
FIG. 4 shows a double screw extruder in cross section.
Figure 5:
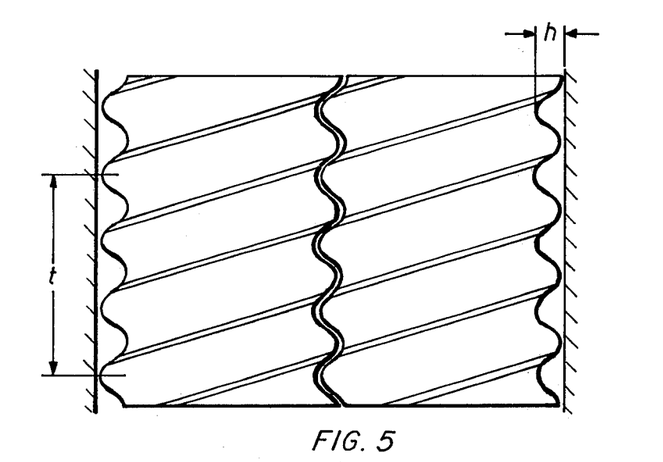
FIG. 5 shows a longitudinal section of the double screw extruder in synopsis of the screw extruder of FIG. 4.

In FIGS. 4 and 5 are shown where the geometrical data $d$ (diameter), $h$ depth of thread) and $t$ (pitch) are measured. In FIGS. 4 and 5 the screws are triple thread screws. For double thread screws $t$, in FIG. 5, is one thread less.

Figure 6:
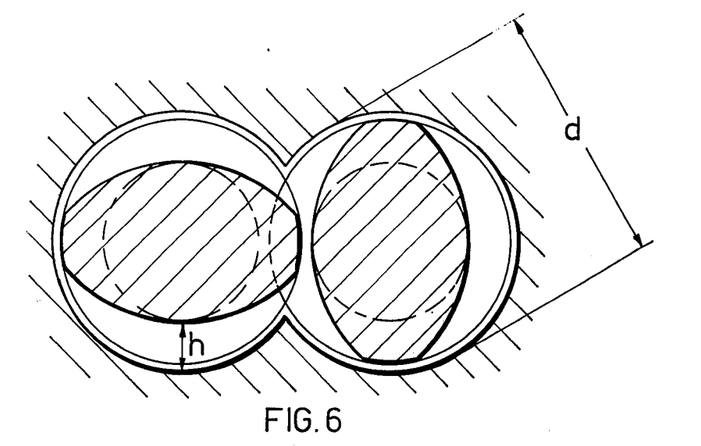
FIG. 6 shows a double thread, double screw extruder in cross section.
Figure 7:
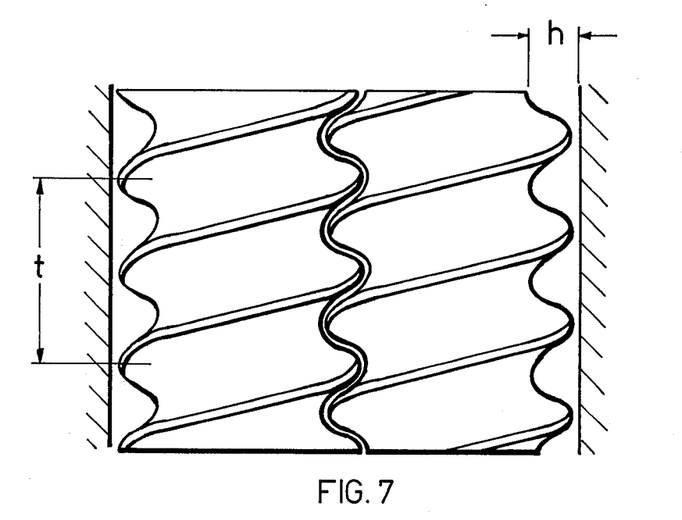
FIG. 7 shows a longitudinal section of the doubke thread, double screw extruder in synopsis of the screw extruder of FIG. 6.

FIGS. 6 and 7 show where the geometrical data $d$ (diameter), $h$ (depth of thread) and $t$ (pitch) are measured for a double thread screw extruder.

The practical application and effect of the solution according to the invention are illustrated in the following Examples, which also prove the validity of the solution for widely differing sizes of screw extruders and widely differing viscosities and temperatures.

The invention is further illustrated, but is not intended to be limited by the following examples.

EXAMPLE 1

Silicone oil with a viscosity $\eta$ of 104 poises at 20° C is required to be transported at a volumetric rate of $q = 39.5$ l/h against a pressure difference of $\Delta p = 2.0$ bar through a two shaft screw extruder with intermeshing triple thread screw shafts rotating in the same sense at a speed of $n = 60$ rev/min. The internal diameter $d$ of the extruder housing is 53.4 mm, the distance between the axes of the two screw shafts is 48.01 mm, and the depth of thread $h$ is 5.78 mm (measured from the base of the screw channel to the internal diameter of the housing), in other words the ratio $h/d$ is 0.1082, the radial screw clearance between the crest of the screw thread and the wall of the housing is 0.225 mm and the clearance between the two screw shafts, in other words between the crest of the thread on one shaft and the base of the screw channel on the other is 0.615 mm. The length L of the pressure build-up zone is required to be minimized in accordance with the optimum ratio of $t/d$.

The non-dimensional throughout coefficient $q/nd^3$ is in this case 0.072. The optimum screw pitch ratio $t/d$ obtained from FIG. 1 or with the aid of the above equation for $f_1$ is therefore 0.842, in other words the optimum screw pitch $t$ is 45 mm. When using the screw of this pitch, the required pumping operation could be carried out with a measured pressure build up length L of 230 mm. The other elements with different screw pitches supplied with the commercial screw assembly boxes for this extruder were also tested for this problem. The following pressure build up lengths were found: at $t = 30$ mm, in other words smaller than optimum pitch, L = 330 mm; at $t = 60$ mm, L = 245 mm and at $t = 90$ mm, L = 300 mm. The example shows that both larger values and smaller values than $t = 45$ mm result in larger, i.e. geometrically less advantageous values for the pressure build-up length, and we, therefore, have here a true case of optimization. It is clear from the example that when conventional pitches which are not optimal for this case are used, pressure build-up zones up to 43% longer are required.

EXAMPLE 2

The pumping operation described in Example 1 is required to be performed in the two shaft screw extruder described in Example 1, but in this case with the smallest possible driving power. According to the invention, given the same throughput coefficient $q/nd^3 = 0.072$ as in Example 1, the optimum pitch ratio $t/d$ for achieving minimum energy output is again 0.842 in other words the optimum pitch $t = 45$ mm is the same as for geometric optimization. When this pitch was used for the pumping operation mentioned above, the net driving power P was found to be 27 W. The following net values for driving power were found when the other conventional screw pitches were also treated experimentally: at $t = 30$ mm, P = 40 W; at $t = 60$ mm, P = 28 W and at $t = 90$ mm, P = 34 W. Example 2 shows that when the problem is viewed from the point of view of energy consumption, there is again a true case of optimization since higher driving powers by up to 48% are required both for larger and smaller values than $t = 45$ mm.

EXAMPLE 3

In the following example, the method according to the invention, which was found with the aid of the small screw extruder described above and using moderately viscous silicone oils at room temperature, is applied to a very large screw extruder and a highly viscous synthetic resin melt at a temperature far above 300° C.

A screw extruder having two intermeshing triple thread screw shafts rotating in the same sense, housing with an internal diameter of $d = 162.4$ mm. an axial distance between the two screws shafts of 146 mm and a depth of thread of $h = 16.5$ mm (measured from the base of the screw channel to the internal diameter of the housing), in other words a ratio of $h/d = 0.1016$, is required to transport a hot polycarbonate melt (temperature about 335° C, dynamic viscosity 6,300 poises at 300° C) at the end of a process against a pressure difference of $\Delta p = 60$–70 bar at a mass flow of about 1000 kg per hour with the screw shafts rotating at a speed of about $n = 160$ rev/min. The most important problem is to keep the outflow temperature of the melt from the extruder as low as possible owing to the risk of thermal damage to the product and for this reason to consume as little energy as possible in the pressure build-up section in accordance with the energy optimization criterion, i.e. to operate the section with the smallest possible driving power. The data for this optimization example are summarized in the following table:

| Operating state No. | | | 1 | 2 | 3 | 4 |
|---|---|---|---|---|---|---|
| Screw pitch | t | (mm) | 120 | 180 | 90 | 90 |
| Pitch ratio | t/d | | 0.739 | 1.108 | 0.554 | 0.554 |
| Melt output | | (kg/h) | 1010 | 1040 | 1020 | 1200 |
| Screw speed | n | (rev/min) | 158 | 160 | 162 | 173 |
| Throughput coefficient | q/nd³ | | 0.0249 | 0.0253 | 0.0245 | 0.0270 |
| Pressure difference Δ | p | (bar) | 69 | 67 | 59 | 67 |
| Pressure build up length | L | (mm) | 465 | 610 | 310 | 370 |
| Melt outflow temperature | | (°C) | 370 | 378 | 362 | 366 |

The non-dimensional throughput coefficient $q/nd^3$ was obtained from the melt density of 1.0 kg/dm³ found at these temperatures. The pressure difference $\Delta p$ and pressure build up length L could be determined by means of several pressure gauges within the pressure build up zone. The melt extrusion temperature was measured very carefully, taking several readings at different times and at different positions. Although the local driving power in the pressure build-up section could not be measured, the melt extrusion temperature is a direct reflection of the energy relationships.

The operating states 1 to 4 are entered in FIG. 2 as the point of paired coordinates $t/d$ and $q/nd^3$ (numbered 1 to 4, respectively). Operating states 1 and 2 clearly lie outside the shaded optimization area, therefore, require optimization. On comparing the above table with FIG. 2, it is seen that the worst operating state (No. 2) which has the longest pressure build-up zone and the highest melt extrusion temperature, is also furthest removed from the solution according to the invention. The method according to the invention was applied to obtain the operating state 3 (see FIG. 2) and in fact the pressure build-up length of 310 mm obtained in this case was the smallest and the melt extrusion temperature of 362° C was the lowest. Important improvements are therefore achieved in operating state 3 compared with operating state 2, both from the geometric and the energy aspect, the pressure build up length being above halved and the melt extrusion temperature reduced by 16° C.

The fourth column shows an operating state which is slightly different from the three preceding ones, with a 90 mm pitch which is suitable for this case. The throughput rate was increased to 1200 kg/h, and the speed of screw rotation also had to be increased for this purpose but the pressure build up length and extrusion temperature are still below the values obtained in operating state No. 1 with 120 mm pitch. Since the product is able to tolerate a melt extrusion temperature of 370° C, which is the temperature found in operating state No. 1 but the extrusion temperature in operating state No. 4 when the solution according to the invention is applied is only 366° C in spite of an approximately 20% increase in throughput, it may be expected that the throughput could be increased to a value above 1200 kg/h before the melt extrusion temperature again reaches 370° C.

Example 3 shows very clearly on one hand the previous state of the art already mentioned above, e.g. as described by O. Armstroff and H. D. Zettler (3), namely, the method of trial and error with repeated, costly reconstructions of the screw and production losses without any decisive guide lines for optimization, and on the other hand clear advantage obtained when making use of the solution according to the invention.

EXAMPLE 4

The triple thread two shaft screw extruder described in Example 1 is required to extrude a polyurethane elastomer melt with dynamic viscosities at 190° C of 3000 poises at a deformation velocity of D = 0.6 1/sec, 1500 poises at D = 10 1/sec and 1100 poises at D = 100 1/sec at the end of a process against pressure difference $\Delta p$ of approximately 27 bar at a volumetric flow rate $q$ of approximately 50 liters per hour and a screw shaft speed of $n$ = 125 rev/min. The polyurethane elastomer melt is at a temperature of 230° C. A screw with a pitch of $t$ = 90 mm is installed in the ejector zone of the said extruder. It is required to measure the pressure build up length L at the given pitch for the operative state described above and to minimize it by using the solution according to the invention. The data for this example of optimization are summarized in the table below:

| Operating state | | | A | B |
|---|---|---|---|---|
| Screw pitch | t | (mm) | 90 | 30 |
| Pitch ratio | t/d | | 1.685 | 0.562 |
| Volumetric flow rate | q | (l/h) | 50.6 | 51.4 |
| Screw speed | n | (rev/min) | 125 | 125 |
| Throughput coefficient | q/nd³ | | 0.0443 | 0.0450 |
| Pressure difference Δ | p | (bar) | 27.4 | 27.0 |
| Pressure build up length | L | (mm) | 350 | 226 |

The pressure build up length L was determined by means of three pressure gauges installed in the pressure build up section and found to be L = 350 mm for the given pitch of 90 mm. The operating point A shown above which is defined by the pair of coordinates for $t/d$ and $q/nd^3$, is found when entered in FIG. 2 to be in need of optimization since it lies far above the shaded optimization area. When the solution according to the invention is applied, the optimum pitch is found to be $t$ = 30 mm. This was then installed in the machine, and when the pressure build up length was measured in the new operating state B it was found to be reduced by 35% to only L = 226 mm.

EXAMPLE 5

The pumping problem described in Example 4 is now required to be solved for a different screw speed, namely, $n$ = 75 rev/min, still using the same melt and the same triple thread two shaft screw extruder. The shortest possible pressure build up length, in other words geometrical optimization, is again required. The temperature of the polyurethane elastomer melt is in this case 226° C. All the data for this optimization example are shown in the following table:

| Operating state | | | C | D | E |
|---|---|---|---|---|---|
| Screw pitch | t | (mm) | 30 | 45 | 90 |
| Pitch ratio | t/d | | 0.562 | 0.843 | 1.685 |
| Volumetric flow rate | q | (l/h) | 51.4 | 52.0 | 50.6 |
| Screw speed | n | (rev/min) | 75 | 75 | 75 |
| Throughput coefficient | q/nd³ | | 0.0750 | 0.0759 | 0.0739 |
| Pressure | | | | | |

-continued

| Operating state | | | C | D | E |
|---|---|---|---|---|---|
| difference Δ | p | (bar) | 27.0 | 27.0 | 27.0 |
| Pressure build up length L | | (mm) | 476 | 278 | 418 |

At the beginning of the experiment, the pitch of $t = 30$ mm which was optimum for Example 4 was still installed. In the new operating state C with $n = 75$ rev/min (but otherwise practically the same data for $q$ and $\Delta p$ as in Example 4), the new pressure build up length was found to be L = 476 mm. This operating point C is entered in FIG. 2 with the new, larger throughout coefficient of $q/nd^3 = 0.075$, and therefore lies outside the shaded optimization area due to the fact that the new $q/nd^3$ value is greater by 67% than at point B. Operating point C can therefore be improved in accordance with the invention. Since point C lies below the optimization area, a larger pitch is now for the first time more advantageous, in contrast to the previous examples 3 and 4. According to FIG. 2, the optimum pitch for the operating state characterized by $q/nd^3 = 0.075$ is 45 mm, which was realized at point D and resulted in practice in a pressure build up length of only L = 278 mm, so that saving in length of 42% was achieved.

In addition, a pitch of $t = 90$ m which at this time lies above the optimization area in FIG. 2 and is therefore unsuitable was used for the given throughput coefficient. The pressure build up length in Experiment E then increased to L = 418 mm a substantially larger value than that obtained with the optimization procedure described above.

Double thread multi-shaft screw extruders of the type mentioned above, normally have higher ratios of depth of thread $h$/internal diameter of housing $d$ then the triple thread screw extruders discussed so far. This arises quite naturally from the kinematic conditions in response to the practical requirements for self-cleaning screws and not too wide screw crests. Thus, the ratio $h/d$ in doulbe thread multi-shaft screw extruders is normally between 0.11 and 0.29 but again the ratio is normally constant within a screw extruder, as already explained in connection with triple thread multi-shaft extruders. In the same way as in triple thread screw extruders, the screw pitch $t$ is again an easily variable parameter and therefore suitable means for optimizing the extruder in accordance with the criteria described above.

Figure 3:
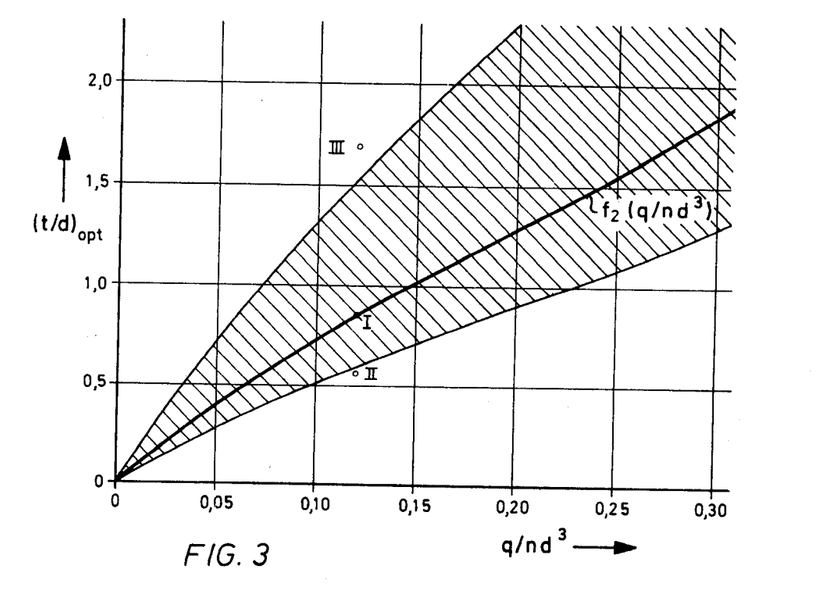
FIG. 3 is a plot of $(t/d)$ versus $(q/nd^3)$, for optimum conditions and the area of optimization for double thread pressure build-up sections. In addition, it also shows a plot of the experimental conditions of Example 6.

The solution according to the invention was demonstrated, as already explained above, by experiments carried out on a triple thread two shaft screw extruder. Since these experiments are very expensive and the solution according to the invention provides an experimentally substantiated basis, the procedure found experimentally for a triple thread multi-shaft screw extruder was transferred on the basis of theoretical considerations to double thread multi-shaft extruders. The results are illustrated in FIG. 3. Here again a singl optimization rule is obtained both for geometric optimization and for energy optimization. For double thread multi-shaft screw extruders of the type mentioned above with a ratio of depth of thread to internal diameter of housing of $h/d = 0.206$, the following mathematical function for $f_2$ was found for the optimum pitch ratio $(t/d)_{opt}$ (see also FIG. 3):

$$(t/d)_{opt} = f_2(q/nd^3) = 8.8212 \cdot (q/nd^3) - 18.414 \cdot (q/nd^3)^2 + 31.668 \cdot (q/nd^3)^3$$

Here again, in the same way as explained for triple thread multi-shaft extruders, it is necessary to delimit an optimization area because it is impossible to realize every value for $t$ read off the graph or calculated in accordance with the function $f_2$ since only standard pitches which vary stepwise are available. The optimization area in FIG. 3 is determined by the following two limiting equations: Lower limit:

$$t/d = 0.7 \cdot f_2(q/nd^3)$$

Upper limiting equation:

$$t/d = 1.8 \cdot f_2(q/nd^3)$$

This optimization area also includes partially the range of ratios of depths of thread to internal diameter of housing of $h/d$ is about 0.11 to 0.29 which is usual for double thread screw extruders of the type mentioned above, the smaller values for $t/d$ in the optimization area being preferable for larger ratios of $h/d$ within the given range while the larger relative pitches $t/d$ are preferable for smaller relative depths of thread $h/d$. This is considered and made precise in the mathematical equation by using $f$ instead of $f_2$ wherein $$f\left(\frac{h}{d}, \frac{q}{n \cdot d^3}\right) = \frac{0.206}{h/d} \cdot f_2\left(\frac{q}{n \cdot d^3}\right).$$

Of course in view of the above mentioned reasons for all $h/d$ ratios there are also necessary optimization areas, which are defined by the following limiting curves:

lower limiting curve: $\frac{t}{d} = 0.7 \cdot f\left(\frac{h}{d}, \frac{q}{n \cdot d^3}\right)$ upper limiting curve: $\frac{t}{d} = 1.8 \cdot f\left(\frac{h}{d}, \frac{q}{n \cdot d^3}\right)$

EXAMPLE 6

The application of the solution according to the invention to a double thread two shaft screw extruder is demonstrated by the following example. This is a theoretically derived example.

In a double thread two shaft screw extruder with intermeshing screws rotating in the same sense, with the internal diameter of the housing $d = 32.0$ mm, axial distance between the two screw shafts of 25.8 mm, depth of thread $h = 6.6$ mm (determined from the base of the screw channel to the internal diameter of the housing) in other words a ratio of $h/d = 0.206$, radial screw clearance between crest of screw and wall of housing $= 0/25$ mm and clearance between the two screw shafts, i.e. between the crest of one screw and the base of the screw channel on the other shaft of 0.65 mm, it is required to transport silicone oil with a viscosity of $\eta = 300$ poises at 20° C against a pressure difference of $\Delta p = 3$ bar at a volumetric flow rate of $g = 26$ l/h and at a screw speed of $n = 110$ rev/min. The extruder is required to operate with the smallest pressure build up length L and lowest driving power P, in other words it is required to be both geometrically optimized and energy optimized.

The non-dimensional throughput coefficient $q/nd^3$ is found in this case to be 0.12. According to FIG. 3 or the mathematical function $f_2$, the optimum pitch ratio for this operating state of the double thread extruder described above is therefore $t/d = 0.848$, in other words the optimum screw pitch is $t = 27$ mm (operating point I in FIG. 3). For this pitch, the pressure build up length required for the pumping task defined above is assessed from calculations to be L = 140 mm. Substantially greater pressure build up lengths are determined theoretically for two other values for pitch which lie outside the optimization area in FIG. 3, namely L = 200 mm for $t = 18$ mm (operating point II) and L = 190 mm for $t = 54$ mm (operating point III in FIG. 3). The calculated net driving power for the optimum operating state I with a pitch of 27 mm is P = 30 W, for the operating point II with a pitch of 18 mm, P = 45 W, and for the operating state III with a pitch of 54 mm, P = 40 W. It should be noted again that these calculated values for the above mentioned double thread two shaft screw extruder have been obtained by theoretically transferring the ratios measured on triple thread screw extruders.

The example clearly shows that the present invention affords considerable advantages also for double thread screw extruders of the type mentioned above.

All the examples show very clearly that as regards geometric optimization and energy optimization particular importance must be attached to the correct determination in accordance with the invention of the parameter screw pitch $t$/diameter $d$. The aim of optimization is achieved only when the value of $t/d$ is strictly associated with the given operating state which is characterized by the throughput coefficient $q/nd^3$. The solution according to the invention could also be shown to be valid when transferred to a very large screw extruder, an achievement which is still unattained by other methods of calculation which have the same object in view, see (3).

For convenience the prior art literature discussed hereinabove has been identified by numerals and the full indentication has been collected immediately hereinafter.

LITERATURE REFERENCES

1. R. Erdmenger, CIT 36 (9164), 3, pages 175/185.
2. H. Herrmann, Schneckenmaschinen in der Verfahrenstechnik, 1972, pages 122, 123, page 29.
3. O. Armstroff and H.D. Zettler, Kunststofftechnik 12 (1973) 9, pages 240–243.
4. H. Herrmann, same as (2) but page 18, pages 122, 123.
5. H. Hermmann, same as (2) but page 18.
6. J. Pawlowski CIT 39 (1967) 20, pages 1180/1186, in particular page 1185.
7. J. Pawlowski, Die Aehnlichkeitstheorie in der physikalischtechnischen Forschung, 1971, page 143.
8. G. Schenkel, Kunststofftechnik 12 (1973) 7, pages 171/175.
9. G. Schenkel, Kunststofftechnik 12 (1973) 8, pages 203/208.
10. G. Schenkel, Kunststoff-Extrudertechnik, Munich 1963.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A method of building up pressure within a material comprising using a multi-shaft screw extruder having a plurality of screw shafts arranged to intermesh in pairs and to rotate pairwise in the same sense, in which each screw shaft of a pair has a double thread pressure buildup section corresponding to that of the other screw shaft, wherein the pressure buildup sections have at least in part a ratio of screw pitch $t$ to the internal diameter of the housing $d$ within the range given by the following relationships:

$$\frac{t}{d} > 0.7 \cdot f\left(\frac{h}{d}, \frac{q}{n \cdot d^3}\right);$$

$$\frac{t}{d} < 1.8 \cdot f\left(\frac{h}{d}, \frac{q}{n \cdot d^3}\right)$$

where $q$ is the volumetric throughput of material of a screw pair, $n$ is the speed of rotation of the screw shafts and $h$ is the screw thread depth, and:

$$f\left(\frac{h}{d}, \frac{q}{n \cdot d^3}\right) = \frac{A}{h/d} \cdot \left[a \cdot \left(\frac{q}{n \cdot d^3}\right) - b \cdot \left(\frac{q}{n \cdot d^3}\right)^2 + c \cdot \left(\frac{q}{n \cdot d^3}\right)^3\right]$$

wherein
$A = 0.206;$
$a = 8.8212;$
$b = 18.414;$
and
$c = 31.668$

2. A method of building up pressure within a material comprising using a multi-shaft screw extruder having a plurality of screw shafts arranged to intermesh in pairs and to rotate pairwise in the same sense, in which each screw shaft of a pair has a triple thread pressure buildup section corresponding to that of the other screw shaft, wherein the pressure buildup sections have at least in part, a ratio of screw pitch $t$ to internal diameter of housing $d$ within the range given by the following relationships:

$$\frac{t}{d} > 0.7 \cdot f\left(\frac{h}{d}, \frac{q}{n \cdot d^3}\right);$$

$$\frac{t}{d} < 1.8 \cdot f\left(\frac{h}{d}, \frac{q}{n \cdot d^3}\right)$$

where $q$ is the volumetric throughput of material of a screw pair, $n$ is the speed of rotation of the screw shafts, and $h$ is the screw thread depth, and:

$$f\left(\frac{h}{d}, \frac{q}{n \cdot d^3}\right) = \frac{A}{h/d} \cdot \left[a \cdot \left(\frac{q}{n \cdot d^3}\right) - \right.$$

$$b \cdot \left(\frac{q}{n \cdot d^3}\right)^2 + c \cdot \left(\frac{q}{n \cdot d^3}\right)^3\right]$$

wherein
$A = 0.1082$;
$a = 15.316$;
$b = 69.111$;
and
$c = 261.85$.

* * * * *